United States Patent

[11] 3,560,712

| [72] | Inventor | George G. Toohill<br>c/o G & G Company P.O. Box 1477,<br>Huntington Beach, Calif. 92647 |
|---|---|---|
| [21] | Appl. No. | 825,653 |
| [22] | Filed | May 19, 1969 |
| [45] | Patented | Feb. 2, 1971 |

[54] STRESS-RELIEVING APPARATUS
3 Claims, 4 Drawing Figs.

| [52] | U.S. Cl. | 219/483, 219/497 |
|---|---|---|
| [51] | Int. Cl. | H05b 1/02 |
| [50] | Field of Search | 219/483, 486, 487, 497 |

[56] References Cited
UNITED STATES PATENTS

| 3,256,734 | 6/1966 | Storke | 219/497 |
|---|---|---|---|
| 3,315,063 | 4/1967 | Ihlenfeldt | 219/497 |
| 3,371,191 | 2/1968 | Seney | 219/497 |
| 3,431,399 | 3/1969 | Venning | 219/497 |

Primary Examiner—Bernard A. Gilheany
Assistant Examiner—F. E. Bell
Attorney—Georges A. Maxwell

ABSTRACT: Apparatus for automatically controlling the flow of electric current to a plurality of electric heater units to selectively control the rate at which structure related to each heater unit is heated; to maintain the structure to be heated at a predetermined maximum temperature for a predetermined period of time and to control the rate at which the structure is cooled, said apparatus including a variable power supply unit for each heater unit, temperature sensing means related to the structure to be heated by each heater unit and control means between the power supply unit and the temperature sensing means including a manually adjustable timed programmer and recorder and adjustable means related to the power supply units and under the control of the timed programmer.

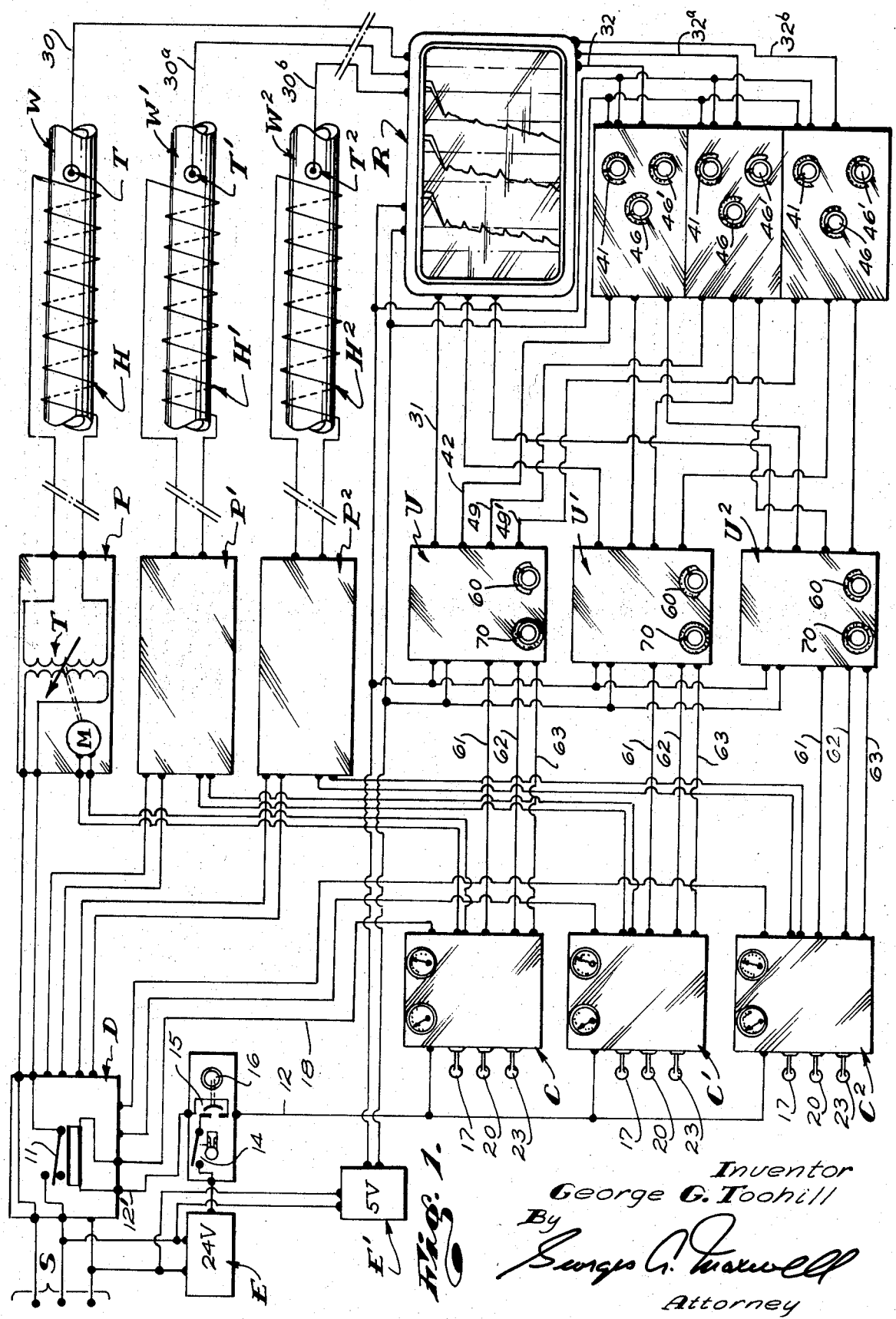

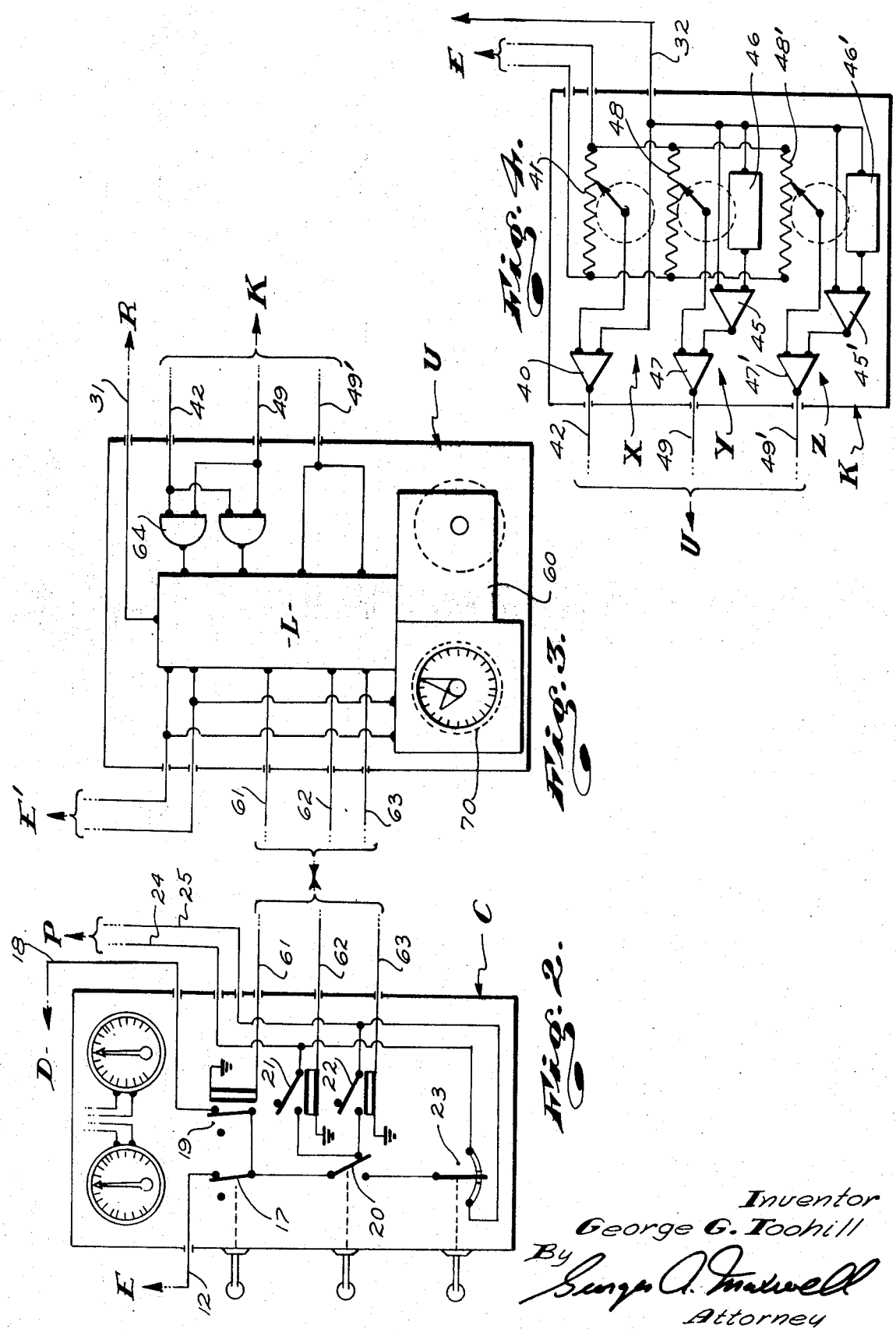

STRESS-RELIEVING APPARATUS

Throughout the metals fabricating and welding arts it is frequently necessary that parts to be secured or fixed together be stress-relieved prior to and/or during that period when they are worked upon, to compensate for detrimental expansion, contraction, distortion and/or oxidation and the like, which would otherwise occur.

When stress-relieving is required, it is seldom that the metal parts to be worked upon can be heated and cooled indiscriminately, rather the parts must be heated slowly and under exacting controls, over protracted periods of time; must frequently be maintained at a predetermined maximum temperature for protracted periods of time to establish a set and before they can be worked upon and, finally, they must be cooled under exacting and controlled conditions in much the same manner as they are heated.

It is not infrequent that parts to be stress-relieved must be heated to temperatures well in excess of 2,000° F., that they must be heated at a low rate, for example 50° F. per hour, that they must be maintained at the predetermined maximum temperature for protracted periods of time (often several hours) before being worked upon and, finally, that they must be cooled at a very slow and controlled rate. As a result, the entire process of stress relieving a single part may take several days.

Stress-relieving of parts in factories and the like, where small parts are being worked upon and where ovens and other environmental apparatus can be advantageously provided, there is much latitude as to the means employed to carrying out such a process.

In practice, there are a great and ever-increasing number of situations where stress-relieving of parts must be performed in the field or on a job site, remote from factory environments and where those means available in factories for stress-relieving are not available or applicable. Examples of such situations are to be found in the establishment of steam or hydroelectric generating plants, petroleum refineries, and other large industrial complexes where large and extensive piping systems and the like must be fabricated at and in their fixed predetermined environment. In such situations, portable stress-relieving equipment must be employed. It is this type or class of equipment that the present invention is particularly concerned with.

Ordinary or conventional portable stress-relieving equipment of the class or type which the present invention is primarily concerned with involves a portable transformer type of variable output power pack to be connected with an available commercial electric service, and a suitable resistance heater connected with the output of the power pack and suitably related to the work to be stress-relieved. The power pack is manually controlled and requires the constant attention and supervision of a trained and skilled operator.

The program of heating, holding the maximum heat and cooling of the part being worked upon is predetermined by engineering techniques and the operator is required to follow the established program, exactly.

To facilitate carrying out the program of heat treating a part, temperature sensing devices, such as thermocouples are applied to the work and are connected with suitable gauges which the operator can visually monitor and thereby determine the exactitude with which the program is being carried out.

On the average field job where stress-relieving is required, it is seldom that a single piece of work must be stress-relieved and worked upon, rather, there is normally a multiplicity of such parts. A separate power pack with its related controls must be provided for each piece. Such part and a separate operator must be provided to supervise the operation of each piece of equipment and the stress-relieving of each part.

The foregoing requires the use and employment of a multiplicity of unrelated pieces of equipment or apparatus and attending operators and, in addition to being uneconomical or costly, is awkward and troublesome.

Further, since the ordinary heat treating apparatus of the character referred to above is manually controlled, the matter of human error and exercise of poor skill and/or judgement on the part of the operator of such equipment or apparatus is ever present.

An object of the invention is to provide a novel stress-relieving apparatus which is such that a multiplicity of parts or pieces of work can be advantageously worked upon or stress-relieved thereby.

It is another object of the invention to provide an apparatus of the character referred to having a single control means which is such that a single operator can advantageously oversee and control the stress-relieving of a multiplicity of parts.

Still further, it is an object of this invention to provide a control means of the character referred to which is such that the program for stress-relieving each part being worked upon can be fed or imparted into the controls and is automatically carried out by the control means and with the end result that the possibility of human error is materially reduced or eliminated and so that an operator having general or ordinary skill can be safely left to operate the apparatus.

In the past, when stress-relieving of a part has failed to gain the desired end results, such failure has been blamed on the operator of the equipment, or at least has subjected the operator to question and suspicion.

An object of this invention is to provide an apparatus of the character referred to which in addition to automatically carrying out a stress-relieving program also records the program from start to finish and so that if the desired end results are not attained the operator's performance is not subject to question and attention is properly directed to the program which was provided him.

It is an object of the present invention to provide a single, compact, neat piece of equipment or apparatus which does not litter or clutter the job sites on which it is employed and which does not create undue interference to other work being carried on at said sites.

Yet another object of the invention is to provide an apparatus of the character referred to which is easy and economical to manufacture and maintain, easy to operate and highly effective and dependable in operation.

The various objects and features of the invention will be fully understood from the following detailed description of typical preferred form and application of the invention, throughout which description reference is made to the accompanying drawings, in which:

FIG. 1 is a diagrammatic view of the apparatus that we provide; and

FIGS. 2, 3 and 4 are diagrammatic views of portions or sections of the apparatus illustrated in FIG. 1 of the drawings.

Referring to FIG. 1 of the drawings, the apparatus that I provide is, for the purpose of illustration, shown as being capable of handling or working upon three pieces of work at one time, there being three pieces of work, W, W' and W² shown at the upper right-hand corner of the drawing. It is to be understood that, in practice, the apparatus is or can be made to handle a considerably greater number of pieces of work without departing from the spirit of the invention.

The number of pieces of work which the apparatus is capable of handling is, from a practical standpoint, only controlled by the wishes, desires or requirements of the purchasers and/or ultimate users of the apparatus.

Related to each piece of work and comprising parts of our invention is a resistance heater and a heat sensing device, such as a thermocouple, identified in the drawings by characters H, H', H², T, T' and T², respectively.

The heaters H, H' and H² can be of any suitable design and construction and are, for the purpose of illustration, shown as simple coils of resistance wire wrapped about their related pieces of work.

The apparatus next includes power packs P, P' and P² related to the heaters H, H' and H², respectively.

The power packs are power operated or driven variable output transformers adapted to step down voltage and step up current as circumstances require, and upon demand. The circuitry of the first or uppermost power pack P is shown symbolically for the purpose of this disclosure, it being understood that the circuitry of the power packs P and P² are the same.

Each of the several power packs is connected with and receive power from a single power distributor unit D, which unit is connected with a suitable electric power service, for example, a typical three-phase commercial power service S. The power packs P, P' and P² are connected with the unit D by pairs of lines 10, 10ª and 10ᵇ, respectively, each of which pairs of lines is under control of a contactor or heavy duty relay 11, one of which is shown symbolically in the block designated D in the drawings, for the purpose of illustration.

The relay 11 illustrated is that relay related to the power pack P. Similar relays are provided for each power pack P' and P².

The relay or relays 11 of the unit D are controlled by separate and related power control units C, C' and C².

The power control units C, C' and C² are alike and are arranged in a common low voltage direct current operating circuit receiving power from an AC-DC converter E suitably connected with the power service S.

The converter E is connected with the units C by a line or lines 12 and with the relays 11 of the unit D by a line or lines 12'.

In the preferred carrying out of the invention a master on and off switch 14 is provided to control current flow from the converter E to the units D and C.

Also, in the preferred carrying out of the invention, an overload or circuit breaker 15, with a button 16 is provided in the operating circuit to prevent overheating of the circuit with resulting damage to that circuit or the remainder of the apparatus.

Each power control unit, one of which is illustrated symbolically in FIG. 2 of the drawings, includes a manually operable primary on and off switch 17 which, when closed, conducts current to its related relay 11 through a line 18.

Current flow from the switch 17 into and through the line 18 is under control of a relay 19 in the unit C, which relay is under control of a related programmer unit U, the details of which will be considered in greater detail in the following.

In addition to the foregoing, each unit C includes a manually operable switch 20 adapted to place the apparatus in an automatic mode where operation of the power pack P related to the unit C is under control of the programmer unit U related to it or is manually controllable.

The contactor of switch 20 is connected with the power source, one contact thereof is connected with a pair of relay switches 21 and 22 under control of the unit U and the other contact of which is connected with the contactors of a three-way manually operable power output control switch 23. A first contact of the switch 23 is connected with one side of the drive means M for the transformer T of its related power pack by a line 24, a second contact of the switch 23 is connected with the other side of the means M by a line 25 and the third contact of that switch.

With this relationship of parts, it will be apparent that when the switch 30 is closed for manual operation, the means M is of the power pack P can be operated to increase or decrease transformer output by manual operation of the switch 23.

The switch 20 of each unit C, when closed for automatic operation and for control by its related unit U is connected with the lines 24 and 25 or by the relays 21 and 22, respectively, which relays are normally open.

In addition to the foregoing and in the preferred carrying out of the invention, suitable voltage and current gauges 26 and 27 are provided in or near the units C and the several manually operable switches for visual monitoring of the output of the related power pack P and to facilitate the operator of the apparatus to make necessary adjustments in the operation of the apparatus. The gauges can be operatively connected with the unit P in any desired manner.

The unit U related to each unit C is a programmer unit to control the several relay switches 19, 21 and 22 of the unit C and is itself under control of a recorder R which is connected with the temperature sensing devices or thermocouples T and three program control units or sections K, K' and K².

There are three like units U, U' and U² and three like units K, K' and K² related or connected in and with their related units C, C' and C² and power packs P, P' and P², respectively.

The circuitry of the units V and K are symbolically illustrated in FIGS. 3 and 4 of the drawings.

A single multipoint temperature recorder R is provided. The recorder R and the several units U and K are supplied with operating current from a secondary low voltage auxiliary power converter E' suitably connected with the power source S.

The temperature recorder R is a multipoint recorder such as is produced by Leeds & Northrop of Philadelphia, Pa., and sold under the trade name "Speedomax W." The details of the above-noted recorder and other similar recorders are not shown. Such recorders are adapted to receive a multiplicity of separate and distinct signals from separate and distinct temperature sensing devices, such as the thermocouples T here provided, and to constantly and sequentially, at high speed and by means of a single stylis or marking device (or a plurality of such devices) record the temperature or signals on a suitable graph, or the like. Such recorders are provided with commutators to receive the signals in predetermined sequence and to distribute said signals to distinct and separate recording circuits or channels which independently and/or collectively control the making device or devices.

The recorder R in the present invention is a recorder such as described above and distinguishes therefrom only in that the temperature signals and the commutated signals are tapped off and conducted to the units U and K as will be hereinafter described.

Since the details of such recorders can vary widely without departing from the spirit of this invention, I will not burden the specification with further detailed description thereof, save to note that the several temperature sensing units T, T' and T² are connected therewith by lines 30, 30ª and 30ᵇ, the commutated signals thereof are conducted to the units U, U' and U² by lines 31, 31ª and 31ᵇ, and the separate temperature signals from the devices T, T' and T², conducted to the recorder are also conducted to the units K, K' and K² by lines 32, 32ª and 32ᵇ. Further, the noted temperature signals can be from either the input or output side of the commutating means of the recorder, as desired.

The control units K, K' and K² are related to the devices T, T' and T² respectively and through the recorder R and to the units U, U' and U² and their related units C, C² and C³, respectively, Each control unit includes three control sections; a temperature limit control X, a heat rate control Y and a cool rate control Z.

The temperature limit control X is adapted to be set to limit the maximum temperature to which the work W is to be raised to and includes a signal comparator 40 receiving the temperature signal from the device T or the recorder R through line 32 and a set control signal from a manually adjustable variable potentiometer or variable resistance 41, connected with the converter E'. The output from the signal comparator 40 is conducted from the unit K to the related unit U by a line 42.

The heat rate control section Y is adapted to sense and control the rate at which the temperature of the work increases and includes a first signal comparator 45 receiving the temperature signal from the recorder R or device T through line 32 and an intermediate temperature signal from a signal memory device 46 arranged between the comparator 45 and the line 32.

The memory device receives the temperature signal from line 32, holds it a predetermined period of time and discharges or transmits it to the comparator 45 for comparison with the actual temperature at the time of discharge. The output signal of the comparator 45 is proportioned to the raise or fall of the temperature of the work during the time period of the memory device 46.

The section Y further includes a second signal comparator 47 receiving the output signal form the comparator 45 and a control signal from a manually adjustable, variable, potentiometer or variable resistance 48 connected with the converter E'. The output signal from the comparator 47 is conducted to the units U through a line 49.

When the output from the comparator 45 and potentiometer 48 reach a predetermined differential as is determined by adjusting and the setting the potentiometer, a plus or minus signal is emitted from the comparator and is conducted to the unit U. The signal thus transmitted indicates whether the raise and/or fall in temperature of the work is at the proper rate.

The section Z of the unit K is identical with the section Y and is provided to control the rate at which the work is cooled, rather than the rate at which it is heated. Two such actions Y and Z are required, as the cool down rate of a piece of work, while as critical as the heat up rate thereof, is frequently more rapid or more slow than the heat up rate.

The section Z like the section Y includes first and second signal comparators 45' and 47', a memory device 46' and a potentiometer 48'. The potentiometer 48' is connected with the converter E', the comparator and memory device are connected with line 32 and the comparator 47' is connected with the unit U by line 49'.

The memory devices 46 and 46' can be in any desired form, but are preferably small compact solid state devices including a computer counter type of timing circuit to effect the desired time period, the sample temperature signal is held before being discharged. If desired, the memory devices could include capacitors and suitable switches under control of a suitable clock. Since the forms in which the memory devices can take are numerous, we will not burden the disclosure with further detailed consideration thereof.

Each programmer unit (units U, U' and U²) are alike and each includes a logic section L to receive and conduct the signals received from the recorder and its related unit K and to distribute said signals in a predetermined and controlled manner to its related unit C.

The logic section L is connected with and receives operating power from the converter E' as and is connected with the recorder R by line 31 to receive its related commutated signal. The commutated signal received by the logic section L serves to operate a suitable switching means or device so that the said section is rendered operative when that signal is being transmitted and is rendered inoperative when said signal ceases to be received.

Since the process of heating and/or cooling of the work W is slow, sufficient time for temperature change or response to occur must be given between changes in output of the power pack P. Further, the time required for such response can differ widely from one piece of work to another. To effect a desired time delay in operating the power pack P, a manually adjustable timer 60 preferably in the form of a computer clock or counter is related to the logic section L to intermittently put it into and take it out of service or operation. The clock or counter 60 operates a suitable switching mechanism in the section L to gain the desired or necessary dwell or time delay.

The maximum or set temperature signal from section X of the unit K is connected with the section L by line 42 and serves to operate switching means controlling the flow of operating current from the section L through line 61 to the relay 19 of the related unit C and so that when the maximum temperature of the work is reached, the relay switch 19 is opened and power to the power pack P is turned off. Should the temperature drop a predetermined extent, the relays switch 19, by operation of the units U and K would again close and power would be turned on.

The rate signal from the section Y of the unit K is connected with the section L by line 49 and serves to operate the switching means in the section L to control flow of operating current from the section L through lines 62 and 63 to the relay switches 21 and 22 of the unit C, to drive the means M of the power pack P to increase or decrease the output of the power pack P.

In the preferred carrying out of the invention it is desired that if the rate of increase of temperature is too great, the power will be turned off temporarily. To this end, the signal from the section Y of the unit K, in addition to being conducted into that section of section L which controls the relay switches 21 and 22, is also conducted to the section of the section L which controls the power relay 19 and to which the signal from the section X of the unit K is directed.

The output signal of the section Y of unit K is either positive or negative depending upon whether the rate of heat increase is too great or too small. Assuming a positive signal indicates that the rate is too great, the positive signal from the section Y is that current which must be conducted to the power on and off section of the section L to effect turning off of the current supply.

To gain the above results the signal from both sections X and Y are conducted through a signal divider 64 before entering the section L which divider normally conducts the signal from the section X and is such that it will also conduct a positive signal from the section Y to the section L to effect turning off of the power to the power pack P.

So that each time a positive signal from the section Y to the power on and off section of the section L will not effect turning the power on and off repeatedly, the power on and off section includes a power operated switching means driven by the counter 60 and such that the noted positive signal from section Y does not effect turning off of the power supply to the power pack P until that signal has been received by the on and off section of the section L a predetermined number of times. If, in the meantime, the signal from the section Y to the power up and power down section of the section L and controlling relays 21 and 22 has had an opportunity to decrease the power output of the power pack P to effect the desired rate of heating of the work, operation of the on-off section is nulled and power remains on.

In addition to the above, the signal from the section X of the unit K can be conducted to the power up and power down section of the section L to effect turning down section of the section L to effect turning down the output of the power pack P when maximum temperature is reached and so as to set the output of the power pack to a heat sustaining output. To this end, the output of the section X and Y of the unit K are conducted through a signal divider 65 before introduction into the section L. The signal divider 65 normally conducts the signals from the section Y and is such that when the signal from section X reaches a predetermined value or changes in character, for example, from a negative to a positive signal, it will be passed by the device 65 into the section L to effect decreasing the output of the power pack P.

The unit U also includes a manually adjustable timer in the nature of a clock 70 related to the section L and adapted to be set into operation when maximum temperature of the work is reached and to effect maintaining of the temperature of the work at said maximum temperature for a predetermined set period of time.

The clock 70 is energized or set into motion by a suitable switching device in the section L which switching device is closed when the maximum temperature signal from the section Y of unit K is first reached. During the period the clock 70 is operating, the sections X and Y continue to function and to effect increase and decrease of the output of the power pack, until the output establishes a balanced condition at which the work is maintained at a constant temperature.

After the temperature hold period is completed, the clock 70 effects switching of the section L from the heating section thereof to a cooling section therein. This switching puts the section Y OF UNIT K out of service and puts the section Z thereof into service.

The section Z functions similarly, but in reverse from the section Y and transmits signals that indicate whether the rate at which the work cools is greater or less than a set rate. The signal (positive or negative) from the section Z is conducted through line 49' to the cool down section of the section L and operates switching means therein to conduct operating current to the relays 21 and 22 of unit C to effect increasing or decreasing the output of the power pack P, and so that the work is cooled at a predetermined rate.

The cooled down section of the section L is also provided with a switching section under timed control of the counter 60 which serves to operate the relay 19 and to turn the power supply to the power pack P on and off as required, if the function of the section Z, section L and relays 21 and 22 fails behind the desired rate of cool down. To this end, the signal, for example, the negative signal from the section Z of unit K is directed to a power on and off control switching means in the section L which controls the flow of operation current through line 61 to relay 19 of unit C and which is under time control of the counter 60. Accordingly, as in the heating cycle of our apparatus, if the cool down rate is so slow or retarded that lowering of power pack output by means of section Z of unit K and operation of the means M of the power pack P is too slow, power supply to the power pack is shut off temporarily to permit the function of Z and M to catch up with the desired and set rate of temperature change.

Since the set maximum temperature and function of section X of the unit K has no effect in or to the cool down cycle of our apparatus, the necessity of signal dividers and the like, as provided in the heating portion of the section L, is eliminated.

The section L can be a solid state device or section, can be an electromechanical device or section made up of a multiplicity of mechanical and electrically operated switches and relays, or can be a combination of electromechanical and solid state means and devices without departing from the spirit of this invention.

Since the section L can vary widely in form without departing from the spirit of the invention, we have elected not to burden this disclosure with further details of any one form of embodiment of such means.

With the apparatus that I provide, it will be apparent that the structure is basically or fundamentally controlled by the recorder R which recorder is common to all of the plurality of pieces of work and related power packs, heat sensing devices and related units and the like referred to above. The recorder R with its signal identifying, transcribing and commutating or distributing means makes possible and effects tying in and together the several novel, divisible, and independently operable subsystems made up of related power packs, heaters, heat sensing devices and units C, U and K.

With the apparatus that I provide, it will be apparent that a multiplicity of pieces of work can be easily and conveniently stress-relieved, each in accordance with a special program, by and/or under control of a single operator at a single or central station.

It will be further apparent that the stress-relieving program for each piece of work can be advantageous and accurately performed by the apparatus by few and simple adjustments which can be made by a person with ordinary skill in the art.

Having described only a typical preferred form and application of the invention, do not wish to be limited and/or restricted to the specific details herein set forth, but wish to reserve to myself any modifications and/or variations that may appear to those skilled in the art.

I claim:

1. A heat treating apparatus comprising a multiplicity of resistance heaters adapted to be related to work pieces, temperature sensing devices related to each heater and its related work piece, a transformer-type power pack for each heater with power operated drive means to increase and decrease the output thereof, a common multipoint temperature recorder connected with the temperature sensing devices and having commutator means for receiving signals from said devices and distributing said signals in predetermined sequential order to predetermined recording circuits, control means related to the recorder and to the power packs to automatically increase and decrease the power output of the power packs whereby the rate of temperature increase of the work pieces related thereto is maintained at a predetermined set rate, said control means including a pair of normally open relay switches related to each power pack and connected with the drive means thereof are adapted to operate the drive means to increase power pack output and that other connected with the drive means to decrease power pack output, a rate set circuit related to each power pack and a related recording circuit and having a first portion adapted to intermittently receive and hold the temperature signal for a predetermined time period and to compare that signal with the true signal at the end of the time period and to discharge a rate signal, the value of which is proportioned to the rate of change during said time period, a second portion including a manually adjustable potentiometer discharging a rate set signal, a signal comparator receiving the rate and rate set signals and discharging a demand signal which is of one polarity if the rate of temperature change is above and a signal of opposite polarity if the rate of temperature increase is below the set rate and switching means receiving the demand signal and connected with the pair of relays and adapted to effect closing and opening of said relays and resulting increase and/or decrease of power pack output in response to the demand signal.

2. An apparatus as set forth in claim 1 which further includes heat limit means to limit the maximum temperature to which the pieces of work are brought to and including a normally closed power control relay controlling the power to each power pack, a manually adjustable potentiometer discharging a set temperature reference signal, a signal comparator receiving said reference signal and receiving the signal from the related recording circuit and adapted to discharge an operating signal of predetermined value when the reference signal and signal from the recording circuit reach a predetermined ratio, and switching means controlled by said operating signal and controlling the operation of the power control relay to open said power control relay when the set temperature is reached.

3. An apparatus as set forth in claim 1 which further includes heat limit means to limit the maximum temperature to which the pieces of work are brought to and including a normally closed power control relay controlling the power to each power pack, a manually adjustable potentiometer discharging a set temperature reference signal, a signal comparator receiving said reference signal and receiving the signal from the related recording circuit and adapted to discharge an operating signal of predetermined value when the reference signal and signal from the recording circuit reach a predetermined ratio, and switching means controlled by said operating signal and controlling the operation of the power control relay to open said power control relay when the set temperature is reached, said switching means controlling the operation of the power control relay being connected with the control means to receive said demand signal and having timing means related thereto whereby said demand signal effects opening of the power control relay when operation of the first-mentioned pair of relays fails to decrease power pack output sufficiently to maintain the set rate of heat increase during a set period of time.